(12) United States Patent
Cho et al.

(10) Patent No.: US 11,112,900 B2
(45) Date of Patent: Sep. 7, 2021

(54) METHOD AND APPARATUS FOR CONTROLLING VEHICULAR USER INTERFACE UNDER DRIVING CONDITION

(71) Applicants: Hyundai Motor Company, Seoul (KR); Kia Motors Corporation, Seoul (KR)

(72) Inventors: Chung Hoon Cho, Seoul (KR); Seung Ho Jeong, Seoul (KR); Ji Won Yun, Gyeonggi-do (KR); So Young Kim, Seoul (KR); Min Young Yoon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/664,183

(22) Filed: Oct. 25, 2019

(65) Prior Publication Data

US 2020/0057527 A1   Feb. 20, 2020

Related U.S. Application Data

(63) Continuation of application No. 15/720,503, filed on Sep. 29, 2017, now Pat. No. 10,496,220.

(30) Foreign Application Priority Data

Oct. 5, 2016   (KR) .................. 10-2016-0128545

(51) Int. Cl.
*G06F 3/041* (2006.01)
*G06F 3/01* (2006.01)
(Continued)

(52) U.S. Cl.
CPC ............ *G06F 3/0416* (2013.01); *B60K 35/00* (2013.01); *G06F 1/3262* (2013.01); *G06F 3/011* (2013.01);
(Continued)

(58) Field of Classification Search
None
See application file for complete search history.

(56) References Cited

U.S. PATENT DOCUMENTS

2006/0145825 A1*  7/2006  McCall ................. B60R 25/305
                                                  340/426.35
2010/0309331 A1   12/2010  Xu
(Continued)

FOREIGN PATENT DOCUMENTS

JP    2011-006034 A    1/2011
JP    2016-129060 A    7/2016
(Continued)

*Primary Examiner* — Amare Mengistu
*Assistant Examiner* — Sarvesh J Nadkarni
(74) *Attorney, Agent, or Firm* — Mintz Levin Cohn Ferris Glovsky and Popeo, P.C.; Peter F. Corless

(57) ABSTRACT

A method for controlling an in-vehicle user interface includes: providing a vehicle window that serves as an input/output module engaged with at least one of a computing device, a camera and a multimedia device; monitoring whether a change of an air pressure at a neighboring area of the vehicle window is beyond a predetermined threshold range; sensing a touch input via the vehicle window; and generating, in response to the change of the air pressure and the touch input, a control signal of the input/output module.

20 Claims, 7 Drawing Sheets

(51) Int. Cl.
  *G06F 1/3234* (2019.01)
  *H04N 5/232* (2006.01)
  *B60K 35/00* (2006.01)
  *G06F 3/044* (2006.01)
(52) U.S. Cl.
  CPC ......... *G06F 3/044* (2013.01); *H04N 5/23216* (2013.01); *H04N 5/23293* (2013.01); *H04N 5/232945* (2018.08); *B60K 2370/1438* (2019.05); *B60K 2370/152* (2019.05); *B60K 2370/21* (2019.05); *B60K 2370/52* (2019.05); *B60K 2370/77* (2019.05); *G06F 2203/04105* (2013.01)

(56) References Cited

U.S. PATENT DOCUMENTS

| | | | |
|---|---|---|---|
| 2011/0004327 A1* | 1/2011 | Bonnat | G06F 3/0346 700/83 |
| 2012/0018989 A1 | 1/2012 | Breed | |
| 2012/0075462 A1 | 3/2012 | Chen et al. | |
| 2012/0192121 A1* | 7/2012 | Bonnat | G06F 3/0488 715/863 |
| 2013/0135137 A1 | 5/2013 | Mulder et al. | |
| 2014/0097957 A1 | 4/2014 | Breed et al. | |
| 2014/0240143 A1 | 8/2014 | Wu | |
| 2015/0077235 A1* | 3/2015 | Pisz | G06F 3/0488 340/426.23 |
| 2015/0077327 A1 | 3/2015 | Pisz et al. | |
| 2015/0161836 A1 | 6/2015 | Park et al. | |
| 2015/0237579 A1 | 8/2015 | Wu | |
| 2015/0301590 A1 | 10/2015 | Furst et al. | |
| 2017/0300109 A1 | 10/2017 | Chen et al. | |

FOREIGN PATENT DOCUMENTS

| | | |
|---|---|---|
| KR | 10-2016-0011915 A | 2/2016 |
| KR | 10-2016-0057458 A | 5/2016 |

* cited by examiner

METHOD AND APPARATUS FOR CONTROLLING VEHICULAR USER INTERFACE UNDER DRIVING CONDITION

CROSS-REFERENCE TO RELATED APPLICATION

This application is a continuation application of U.S. application Ser. No. 15/720,503, filed Sep. 29, 2017, which claims under 35 U.S.C. §119(a) the benefit of Korean Patent Application No. 10-2016-0128545, filed on Oct. 5, 2016 in the Korean Intellectual Property Office, the entire contents of which are incorporated by reference herein.

BACKGROUND

(a) Technical Field

The present disclosure relates to a method and apparatus for controlling an in-vehicle user interface under a driving condition or an environment of a vehicle, and more particularly, to a control method and apparatus for enabling a driver or a passenger to use a vehicle window as a user interface of a computing device according to a driving condition or an environment of the vehicle.

(b) Description of the Related Art

Vehicle users typically have an interest in operating various instruments and/or accessories while traveling in a vehicle. However, user interfaces (e.g., keypad, screen, or etc.) that can be provided in the vehicle may be spatially limited. Further, adding a complex user interface in the vehicle may impair a driving safety of a driver or a passenger (i.e., an occupant).

A vehicle includes a window. One or more windows mounted on the vehicle are essential for a driver or a user to ensure visibility for the front, rear, and side views while the vehicle moves. If such a window could be used as a user interface, the convenience of the driver or the user could be enhanced.

Recently, a smart window technology has been suggested. For example, a driver or a user adjusts the amount of sunlight flowing through the windshield of the vehicle by simple manipulation. Such a smart window technology uses a special film inserted in a car window to change the transparency of the car widow based on a received electrical control signal.

On the other hand, a vehicle windshield, which not merely secures a driver's view, but serves as a barrier to wind and rain, can include a 'smart window' function with cutting-edge electronic technology. For example, a head-up display (HUD) may be applied to an in-vehicle glass, which can achieve or add functions/characteristics such as an automatic lighting control, an ultra-light weight, and a touch screen.

The in-vehicle head-up display (HUD) is a technology that projects information or guidance, which is displayed on a conventional instrument panel such as a dashboard, on the eye level of the driver's window. This technique has been used to expand a pilot's front view in a military combat plane. But, the head-up display (HUD) also has been recently applied to vehicles so that the driver or user can obtain necessary information without having to look at the instrument panel or navigation device while driving. As a result, a driver's or user's concentration while driving can be improved and driving safety can be enhanced. Recently, the head-up display (HUD) for a vehicle can engage with a front camera, a Global Positioning System (GPS), and various sensors so as to display different types of information associated with driving.

SUMMARY

The present disclosure provides a method and apparatus for controlling a vehicle window as an input/output module such as a user interface for at least one of: a computing device, a camera, and a multimedia device, which can be equipped in or engaged with a vehicle according to a driving state/condition and a driving mode of the vehicle.

Further, the disclosure provides a control device and a control method in which a vehicle window is as a transparent touch screen for ensuring the visibility of a driver, a user, a passenger, or an occupant.

In addition, the disclosure provides a control method and a control method for using an air pressure sensor to initialize or reset a vehicle window serving as a transparent touch screen.

Further, the disclosure provides a control device and a control method capable of capturing, editing, or processing information of scenery or objects that a driver, a user, a passenger or an occupant can view through a vehicle window.

A method for controlling an in-vehicle user interface can include providing a vehicle window serving as input/output module engaged with at least one of a computing device, a camera and a multimedia device; monitoring, by an air pressure sensor, whether a change of an air pressure at a neighboring area of the vehicle window is beyond a predetermined threshold range; sensing a touch input via the vehicle window; and generating, in response to the change of the air pressure and the touch input, a control signal of the input/output module.

The predetermined threshold range can be set within a pressure range of breathing of a person.

The input/output module can include a touch input device and a display or a screen used for the at least one of the computing device, the camera and the multimedia device.

The generating the control signal can include activating the touch input device and the display or the screen in response to the change of the air pressure; and deactivating the touch input device and the display or the screen when the touch input is not entered for a predetermined time after the touch input device and the display or the screen are activated.

The generating the control signal can further include generating, in response to the change of the air pressure, a signal for resetting the touch input device and the display or the screen.

The method can further include showing, in response to the change of the air pressure, a first touch input button, used for selecting one of the computing device, the camera and the multimedia device, on the vehicle window; and showing, in response to user's input via the first touch input button, a second touch input button, used for operating or controlling selected one of the computing device, the camera and the multimedia device, on the vehicle window.

The second touch input button, when the camera is selected via the first touch input button, can include a frame determining a photography area of scenery or an object through the vehicle window; a shutter button taking a photograph or a video through the frame; and an editing button editing the photograph or the video.

The method can further include engaging the at least one of the computing device, the camera and the multimedia device with an audio-video-navigation device equipped in a vehicle; and engaging the at least one of the computing device, the camera and the multimedia device with a mobile device coupled with a wireless communication unit equipped in the vehicle.

The method can further include deactivating the vehicle window adjacent to driver's seat when movement of a vehicle is detected by a wheel speed sensor; and enabling an air pressure sensor detecting the change of the air pressure when a vehicle door and the vehicle window are closed.

An apparatus for controlling a window mounted on a vehicle, equipped or engaged with at least one of a computing device, a camera, and a multimedia device, can include a processing system that comprises at least one data processor and at least one computer-readable memory storing a computer program. Herein, the processing system is configured to cause the apparatus to provide a vehicle window serving as an input/output module engaged with at least one of a computing device, a camera and a multimedia device; monitor, by an air pressure sensor, whether a change of an air pressure at a neighboring area of the vehicle window is beyond a predetermined threshold range; sense a touch input, by a touch input unit, via the vehicle window; and generate, by a controller, in response to the change of the air pressure and the touch input, a control signal of the input/output module.

An apparatus for controlling an in-vehicle user interface can include a controller configured to provide a vehicle window serving as an input/output module engaged with at least one of a computing device, a camera and a multimedia device; an air pressure sensor configured to monitor whether a change of an air pressure at a neighboring area of the vehicle window is beyond a predetermined threshold range; and a touch input unit configured to sense a touch input via the vehicle window. Herein, the controller generates a control signal of the input/output module in response to the change of the air pressure and the touch input delivered from the air pressure sensor and the touch input unit.

The predetermined threshold range can be set within a pressure range of breathing of a person.

The input/output module can include a touch input device and a display or a screen used for the at least one of the computing device, the camera and the multimedia device.

The controller can activate the touch input device and the display or the screen in response to the change of the air pressure, while deactivating the touch input device and the display or the screen when the touch input is not entered for a predetermined time after the touch input device and the display or the screen are activated.

The controller can generate, in response to the change of the air pressure, a signal for resetting the touch input device and the display or the screen.

The controller can show, in response to the change of the air pressure, a first touch input button, used for selecting one of the computing device, the camera and the multimedia device, on the vehicle window, while showing, in response to user's input via the first touch input button, a second touch input button, used for operating or controlling selected one of the computing device, the camera and the multimedia device, on the vehicle window.

The apparatus can further include a communication unit configured to engage the at least one of the computing device, the camera and the multimedia device with an audio-video-navigation device equipped in a vehicle via a controller area network; and engage the at least one of the computing device, the camera and the multimedia device with a mobile device via a short-range wireless communication method.

The air pressure sensor can be arranged at a surrounding area of the vehicle window, while the camera can be arranged in a vehicle window frame.

The apparatus can further include a wheel speed sensor configured to detect movement of a vehicle. Herein, the controller deactivates the vehicle window adjacent to driver's seat when the wheel speed sensor detects movement of the vehicle.

The apparatus can further include a door sensor configured to detect opening or closing of a vehicle door; and a window sensor configured to detect opening or closing of the vehicle window. Herein, the controller can enable the air pressure sensor detecting the change of the air pressure when the vehicle door and the vehicle window are closed.

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
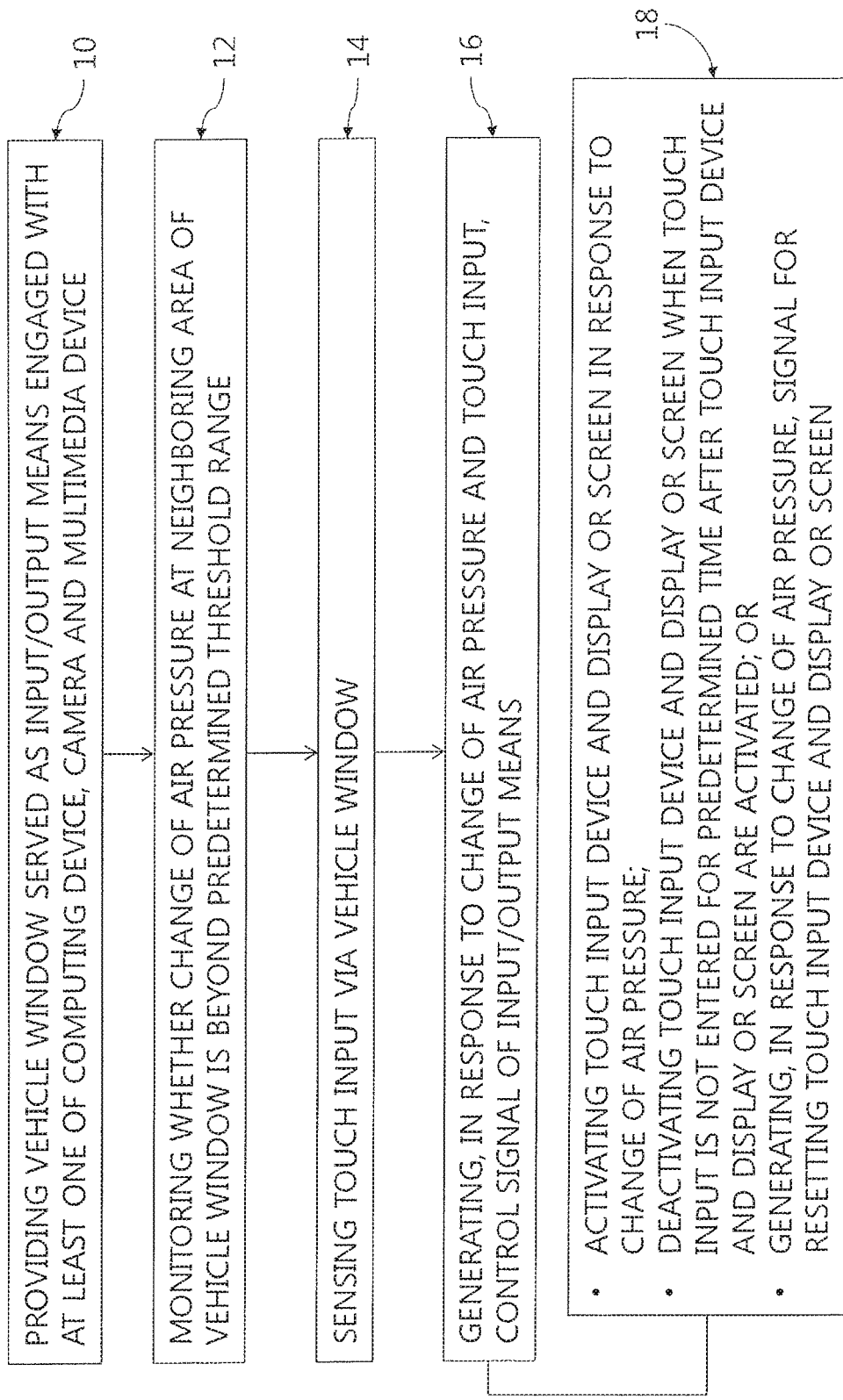
FIG. 1 is a flowchart depicting a control method for an in-vehicle user interface.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN). In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

FIG. 1 is a flowchart depicting a control method for an in-vehicle user interface.

As shown, the control method for the in-vehicle user interface can include providing a vehicle window that serves as an input/output module engaged with at least one of a computing device, a camera and a multimedia device (10), monitoring whether a change of an air pressure at a neighboring area of the vehicle window is beyond a predetermined threshold range (12), sensing a touch input via the vehicle window (14), and generating, in response to the change of the air pressure and the touch input, a control signal of the input/output module (16).

As an in-vehicle user interface, a window included in a vehicle to secure a view of a user, a driver, or a passenger can be provided as input/output module of at least one of a computing device, a camera, and a multimedia device. When the user, the driver, or the passenger blows or expends breath on a vehicle window, the vehicle window can be activated as an input/output module.

The change of the air pressure inside the vehicle (e.g., an interior space of the vehicle) is very slight when the windows and doors of the vehicle are closed while driving. Accordingly, when the user, the driver, or the occupant blows his or her breath on a specific area or a specific space, the air pressure may suddenly or rapidly change in that area or that space due to the breathing. When an air pressure sensor may sense this change of the air pressure, the user interface control device can generate a trigger signal that makes the vehicle window included in the vehicle available as an input/output module. In order to generate the trigger signal, the sensing range of the air pressure sensor could be determined within a pressure range of breathing of a person. If the air pressure sensor senses a change of air pressure beyond a level or a range of the air pressure changed by a person's breathing, it is difficult for the user, the driver or the passenger to use his or her breath so as to activate the vehicle window as an input/output module.

Temperature, humidity, or the like could also be used to detect the person's breathing. However, the range of temperature or humidity that can be changed by the person's breathing can be different in response to an internal condition, circumstance or environment of the vehicle. In the case of detecting the temperature and humidity only without the change of air pressure, erroneous detection could be increased. However, since the air pressure inside the vehicle varies less sensitively than temperature and humidity inside the vehicle, it may be more efficient to detect the person's breathing through the change in air pressure.

However, when a user, a driver, or a passenger uses a folding fan or an electric fan inside the vehicle, a change of air pressure caused by the fan or the electric fan may occur in a manner similar to the change of air pressure due to a person's breath. For example, the change may be considered a user's input when a change of air pressure generated due to a device causing wind, such as a folding fan or an electric fan, is similar to that caused by a person's breath. Thus, in an embodiment, in order to distinguish the cause of the change of air pressure more precisely, another sensor configured to detect temperature, humidity or the like may be used to clearly recognize a breath from the user, the driver or the passenger, with an air pressure sensor.

On the other hand, although not shown, the control method for the in-vehicle user interface may further include activating the air pressure sensor only when a door or a window of the vehicle is closed. If the door of the vehicle is open or the window is open, changes in air pressure inside the vehicle may occur without a user's breathing. Also, the flow of air entering through an open door or window may make a slight or large change, compared with the breathing of the user, the driver or the occupant. Therefore, when the door of the vehicle is open or the window is open, it is difficult to determine whether the change of air pressure is caused by the user's breathing. Accordingly, it is possible to measure the change of air pressure inside the vehicle only when the doors and windows of the vehicle are closed.

An input/output module provided through window(s) of the vehicle may include a touch input device and a display (or screen) for at least one of a computing device, a camera, a multimedia device, and so on. To this end, the window(s) is/are not only made of conventional glass, but may include a (transparent) touch screen panel (TSP). Herein, the touch screen panel (TSP) is a type of input device for recognizing a position of a screen or transmitting recognized position to a processor or a system when a user, a driver or a passenger presses or touches the screen with a finger or a pen. The touch screen panel (TSP) may include a touch panel, a control circuitry, a driver program such as software, and the like.

Particularly, a vehicle window can be a touch panel. The vehicle window may include top and bottom films/glasses deposited with a transparent electrode, e.g., Indium Tin Oxide (ITO). The vehicle window can recognize a position where contact occurs or where a signal generates due to a change of capacitance, and transmit the position to a control circuitry. The control circuitry may convert an analog signal transmitted from the vehicle window into a digital signal so that the digital signal could be recognized in a coordinate form that could be displayed on the screen. The driver program may receive the digital signal delivered from the control circuit to resolve it in order that the touch panel could be utilized in accordance with an applicable apparatus or system.

On the other hand, generating the control signal (16) may include activating the touch input device and the display or the screen in response to the change of air pressure (18), and deactivating the touch input device and the display or the screen when the touch input is not entered for a predetermined time after the touch input device and the display or the screen are activated (18). In addition, the generating the control signal (16) may further includes generating, in response to the change of the air pressure, a signal for resetting the touch input device and the display or the screen (18).

For example, after a window of a vehicle is activated by a detected change of an air pressure, a touch panel included in the window can transmit a signal or a value corresponding to a user's touch on the window when the user, the driver or the passenger touches the window using a finger or the like in an activated state of the window. On the other hand, after the window is activated, the window may be deactivated again if the user, the driver or the occupant does not make any input for a predetermined time. This may be considered a case where the user, the driver or the passenger does not want to work through the window, or where the power consumption is reduced.

Operation of an input/output module by a user, a driver or a passenger in the vehicle can result in various actions. In this case, the control method for the in-vehicle user interface may include providing a first touch input button for selecting at least one of a computing device, a camera, and a multimedia device on a window in response to a change of atmospheric pressure; and providing a second touch input button for controlling at least selected one among the computing device, the camera, and the multimedia device on the corresponding window. For example, the first touch input button may include a menu/button for selecting a device desired to be used by a user, a driver or a passenger, while the second touch input button may include a menu/button for controlling or operating the selected device.

Further, when there is some limitation of a device which a user, a driver or an occupant can use via a window of the vehicle such as an input/output module, for example, when the window may be particularly designed to be used only for a specific program, an application or a specific device equipped in the vehicle, either the first touch input button or the second touch input button can be provided. When an application or an apparatus supports functions or services responsive to a complicated input, the first touch input button or the second touch input button may be provided as an upper or lower level menu/button.

The control method for the in-vehicle user interface can include at least one of engaging at least one of a computing device, a camera, and a multimedia device using a window as an input/output module with an audio-video-navigation device equipped in the vehicle, and engaging at least one of the computing device, the camera, and the multimedia device with a portable or mobile device coupled with an in-vehicle wireless communication terminal. Regarding extendibility, computing devices mounted on a vehicle at the time of manufacture of a vehicle may have limitation. However, when interworking or engaging with an external device through a wired/wireless communication terminal mounted on a vehicle, the extendibility of the computing devices can be enhanced. For example, when a mobile device and a window are mirrored each other, a user, a driver or a passenger can use the window as an input/output module instead of user interfaces of the mobile device, and can use or control various programs or applications supported by the mobile device through the window.

A user, a driver or an occupant in the vehicle might want to do different things, but a vehicle should be designed to secure a driving safety. Therefore, although not shown, the control method for the in-vehicle user interface may further include deactivating a window nearby driver's seat when the vehicle is detected to be moving through a wheel speed sensor. The wheel speed sensor can recognize not only the speed of a wheel but also the movement of the wheel. Herein, the movement of the wheel can be equivalently considered the movement of the vehicle. In a moving vehicle, the driver, unlike the occupant such as a passenger, should secure a driving safety so that the window nearby driver's seat might be forcibly deactivated when the vehicle moves or starts to move.

Figure 2:
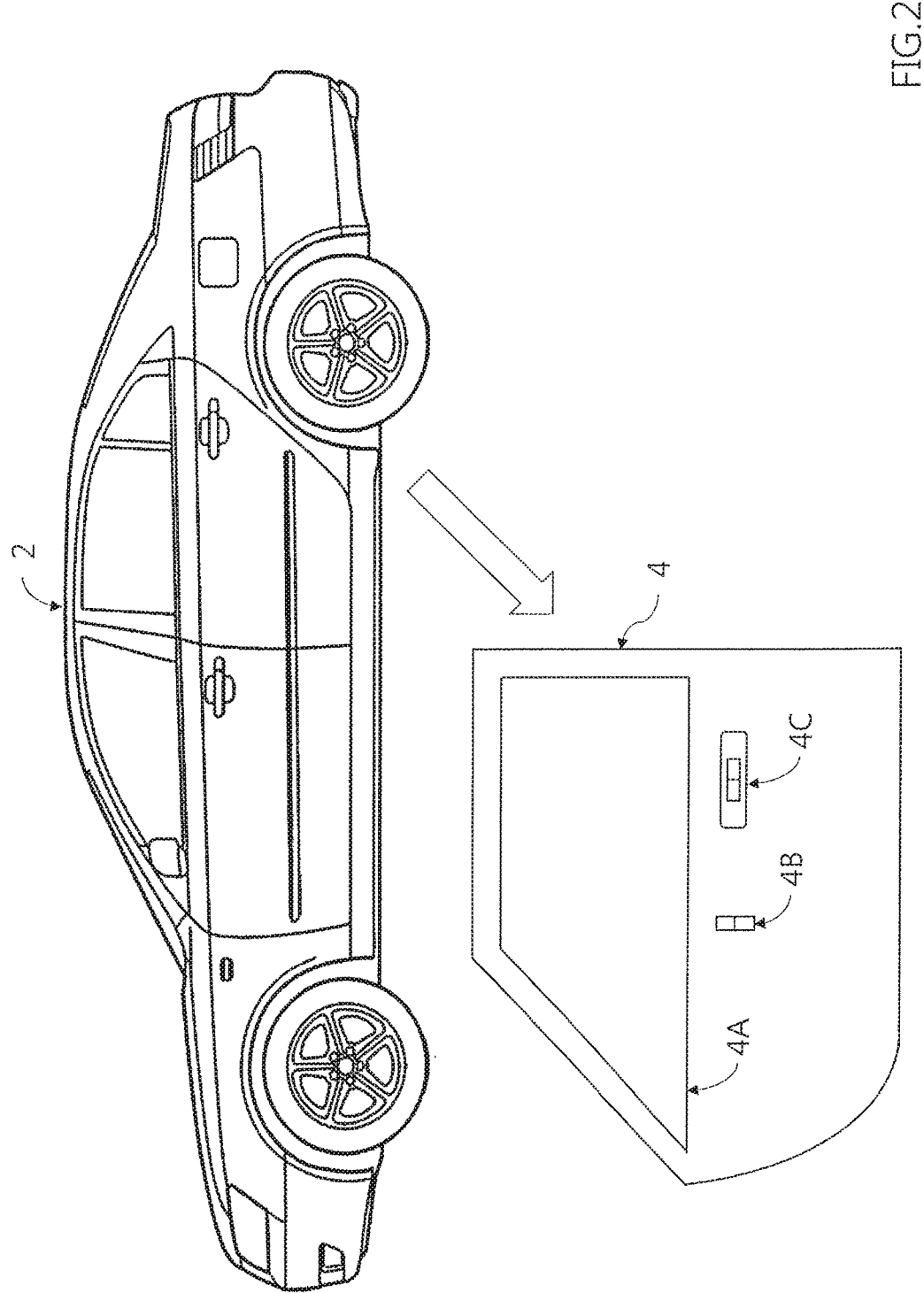
FIG. 2 is a schematic view of a vehicle including vehicle window(s) used as a user interface.

FIG. 2 is a schematic diagram of a vehicle including vehicle window(s) used as a user interface.

As shown, the vehicle 2 includes at least one door 4. The door 4 can include a window 4A, a door opening device 4C, and a window opening device 4B. Herein, the window 4A securing view(s) of a user, a driver, a passenger or an occupant via a glass can include a touch screen panel (TSP). The vehicle 2 can include a control unit that can monitor and control a driving state of the vehicle. The control unit may be coupled with various sensors, operating devices, and auxiliary devices mounted on, or equipped in, the vehicle so that the control unit can transmit to, and receive from, them plural data in real time while the vehicle is moving.

An in-vehicle user interface can provide an environment to a user, a driver, a passenger or an occupant, as a module for performing operations (e.g., recording, manipulation, web search, and data-sharing) on window(s) equipped in the vehicle 2. The in-vehicle user interface may be intuitive and convenient because the user, the driver, the passenger or the occupant can use a transparent touch screen included in the window 4A. Since anyone in the vehicle 2 can operate an audio-video-navigation device (AVN) or an in-vehicle electronic mounted on the vehicle 2 through a transparent touch screen included in the window 4A, it is possible to provide some convenient functions to all seats in the vehicle.

An atmospheric pressure sensor can be provided to detect a user's, driver's, or the passenger's breathing, and may be located on a peripheral edge of the window 4A equipped in the vehicle 2. Further, according to the embodiment, a camera may be located in an inner space (inside the vehicle 2) or on a window frame from the window 4A. A barometer may be used as the atmospheric pressure sensor to recognize user's, driver's or passenger's breathing at a low cost.

For example, the barometer can recognize the air pressure change when an occupant blows his or her breath on the window 4A of the vehicle 2. The window 4A sometimes condensational may be activated as a screen in response to a signal generated from recognized air pressure change. Thereafter, a user's touch on the window 4A can be inputted through a touch panel operated in an electrostatic manner. In addition, after the transparent touch screen of the window is activated and the user sketches on the touch panel, the user blows his or her breath on the window 4A. When the barometer senses the breath, contents sketched on the touch panel, i.e., the window 4A, may be stored and a new input window can be activated. At the time, stored contents can be transmitted to a device such as a portable terminal or the like engaged with the vehicle 2 through a short-range wireless communication technology (e.g., Wi-Fi, Bluetooth, etc.).

Figure 3:
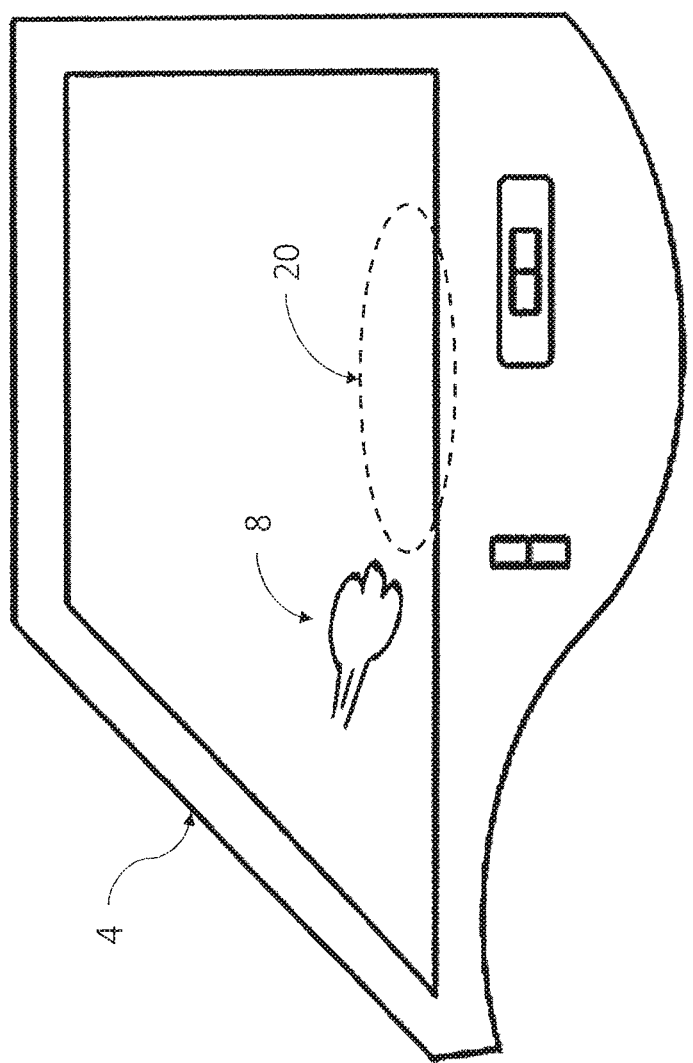
FIG. 3 is a schematic view depicting an operation of an air pressure sensor.

FIG. 3 is a schematic diagram depicting an operation of an air pressure sensor.

As shown, when an air pressure sensor is installed in the vicinity of the window 4A included in the door 4 of the vehicle, the air pressure sensor can recognize whether a user, a driver or an occupant blows a breath 8 in a sensing range 20 of the air pressure sensor.

Herein, the sensing range 20 of the air pressure sensor may vary depending on the position of the air pressure sensor. However, it is possible to increase the convenience of a user, a driver, or a passenger when the air pressure sensor would be located at an area where the user, the driver or the passenger can blow a breath comfortably in a state where the user, the driver or the occupant may sit in a seat.

According to an embodiment, in order to increase user's, driver's or occupant's intuitiveness regarding the sensing range 20 for the breath 8, the air pressure sensor could be installed in close proximity to various control buttons (e.g., a window opening button, a door opening button) that may be included in the door 4.

Figure 4:
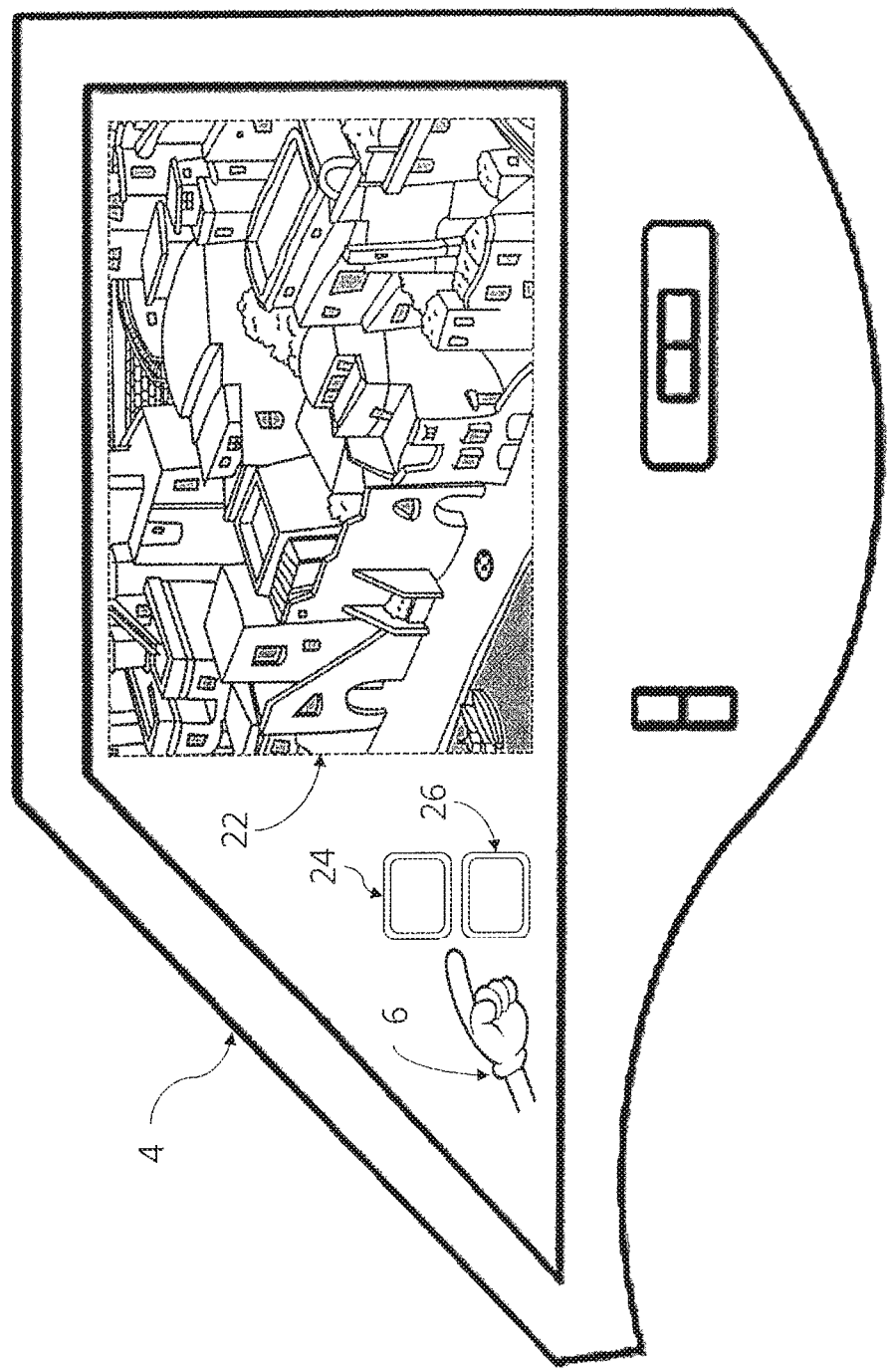
FIG. 4 illustrates a schematic view depicting a first example of an in-vehicle user interface.

FIG. 4 illustrates a first example of an in-vehicle user interface. Particularly, in the first example, a window in a vehicle door 4 is used as a user interface system for a multimedia device (e.g., an audio-video-navigation device mounted on a vehicle, a computing device or a multimedia device possessed by a user, a driver, or an occupant, etc.) equipped in or engaged with a vehicle.

As shown, a transparent touch screen included in the window may include a display area 22, touch input buttons 24, 26, and the like. The size and position of the display area 22 and the touch input buttons 24, 26 may be changed. The display area 22 and the touch input buttons 24, 26 may be overlapped on each other on the screen. The touch input button 24, 26 may include one button or two or more buttons and may deliver a touch input of a user, a driver or a passenger (e.g., touch by user's finger 6).

Figure 5:
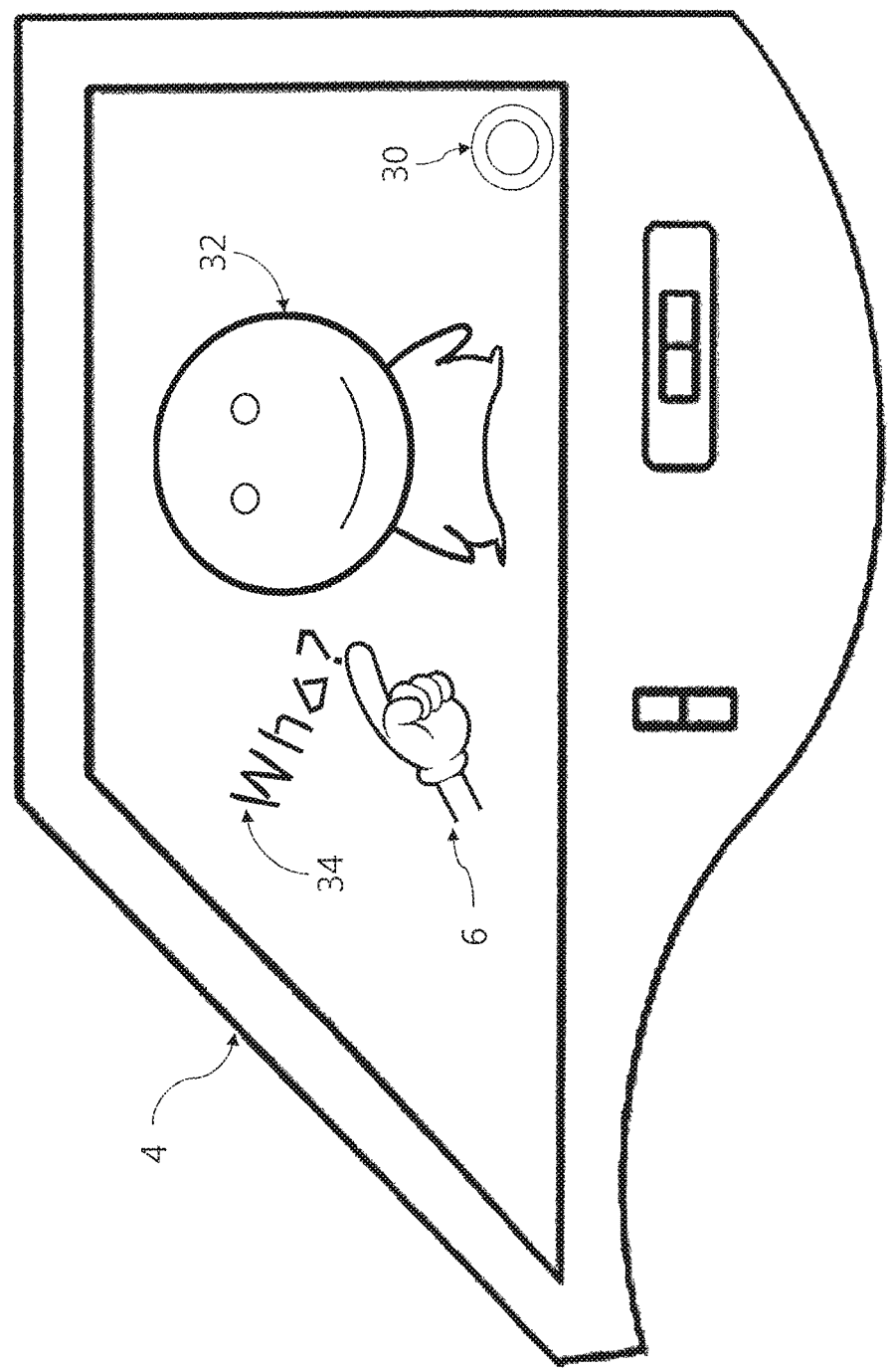
FIG. 5 illustrates a schematic view depicting a second example of the in-vehicle user interface.

FIG. 5 illustrates a second example of the in-vehicle user interface. Particularly, in the first example, a window in a vehicle door 4 is used as a user interface system for a multimedia device (e.g., an audio-video-navigation device mounted on a vehicle, a computing device or a multimedia device possessed by a user, a driver, or an occupant, etc.) equipped in or engaged with a vehicle.

As shown, a computing device in cooperation with a transparent touch screen used as a user interface and included in a window of a vehicle can provide an application creating and editing a picture 32, a text 34, a memo (not shown), etc. through touch input(s) of a user, a driver or a passenger (e.g., touch by user's finger 6). The window of the vehicle can be used as an input/output module for recognizing the touch of the user, the driver or the passenger (e.g., touch by user's finger 6) and displaying inputted contents. The window can recognize information delivered through a touch input button 30. At the time, data or contents created, recorded and stored through the window of the vehicle can be transmitted to and stored in a computing device equipped in the vehicle or a mobile device, a computing device, and the like engaged with the vehicle.

Figure 6:
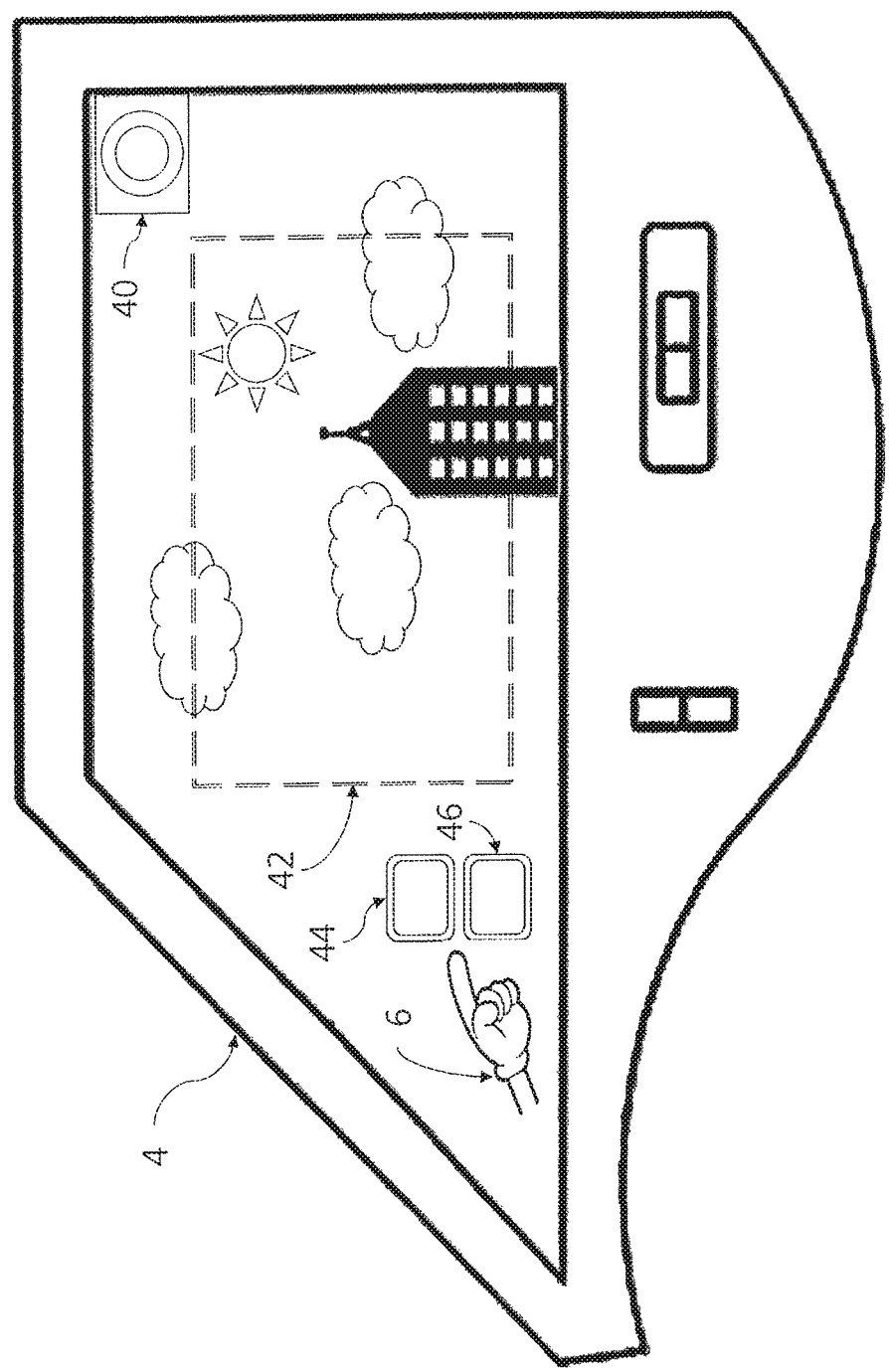
FIG. 6 illustrates a schematic view depicting a third example of the in-vehicle user interface.

FIG. 6 illustrates a third example of the in-vehicle user interface. Particularly, the third example in the case where a window in the door 4 of the vehicle is used as a user interface system for a camera apparatus 40 will be described.

As shown, a transparent touch screen included in the window may include a frame (i.e., a display area 42 capable of serving as a viewfinder of the camera apparatus 40), which displays a photographing area of a landscape or an object seen through a window, and a shutter touch button 44 for controlling a capture of the photographing area. Further, the transparent touch screen included in the window may further include an edit button 46 for enabling editing of photographed image. Herein, the shutter touch button 44 and the edit button 46 are merely by way of example, and may vary depending on functions that can be provided through a transparent touch screen in a camera module, an application, or a computing device to be interlocked.

A user, a driver or a passenger can view outside scenery, objects, etc. through the window in the vehicle, and can activate the transparent touch screen of the window to capture or photograph scenery, objects, etc. in the frame 42. For example, the size, position, etc. of the frame 42 may be fixed based on the position and view direction of the camera apparatus 40. Also, according to an embodiment, the size, the position, and the like of the frame 42 can be adjusted, and the camera apparatus 40 can change a zoom function, a direction and an angle of lens, and the like in response to adjusted characteristics of the frame 42.

Herein, the camera apparatus 40 may be located inside the window or in a window frame. Further, arranged within a spatial range without inconvenience of a user, a driver or an occupant inside the vehicle, the camera apparatus 40 may be detachable.

Further, it is possible to edit a photograph, including a landscape, an object, and the like, captured by the camera apparatus 40 through the edit button 46 or the like on a transparent touch screen included in a window. Through the window, color(s), shape(s), etc. included in the photograph may be spoiled or stored. Further, spoiled color(s), shape(s), etc. may be used in another picture, sketch, and the like through touch input(s) of a user, a driver, or an occupant (e.g., touch(es) by user's finger 6).

Figure 7:
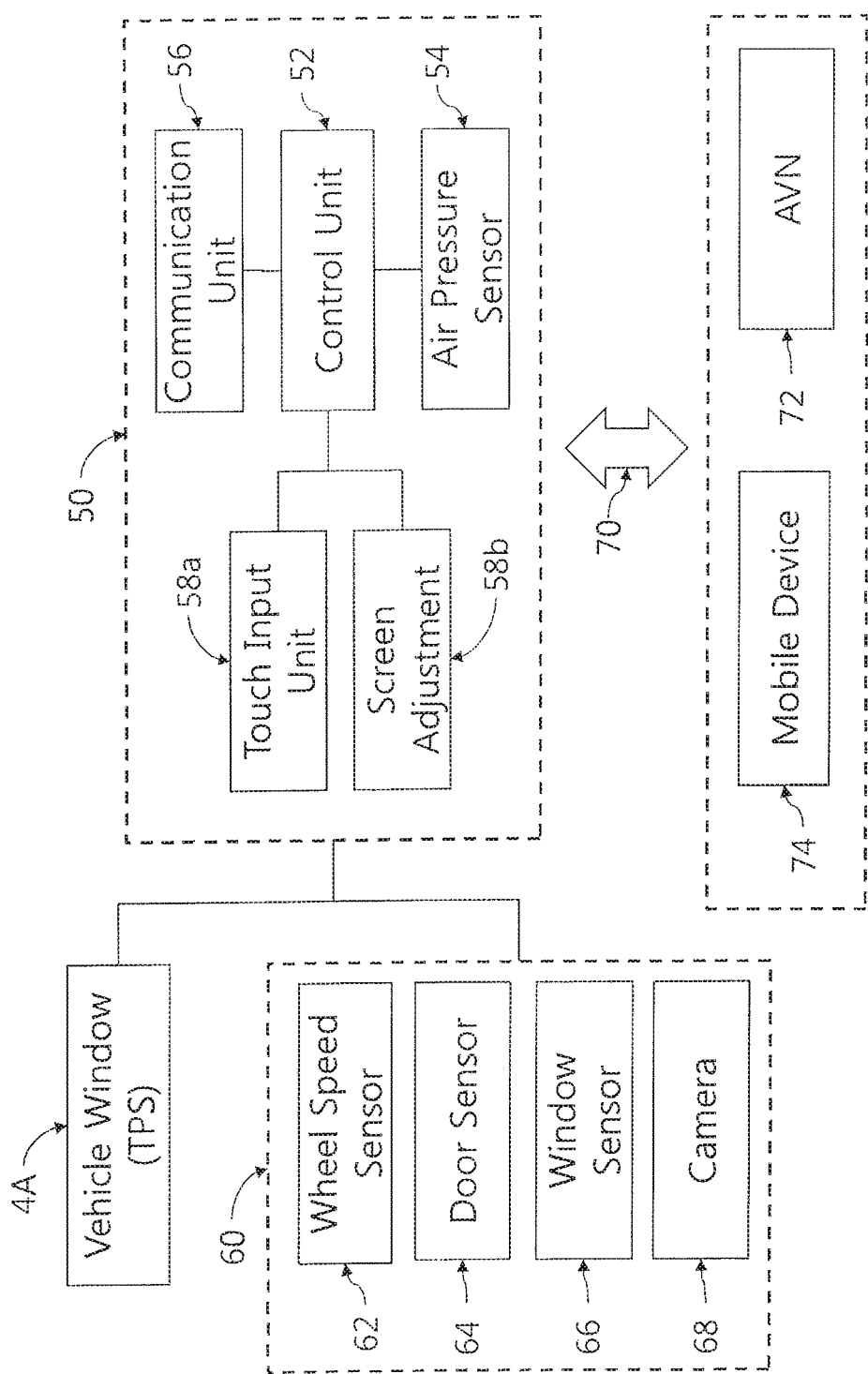
FIG. 7 is a block diagram of a control apparatus for an in-vehicle user interface.

FIG. 7 shows a control apparatus for an in-vehicle user interface.

As shown, an in-vehicle user interface control apparatus 50 can be coupled to at least one of a mobile device 74 possessed by a user, a driver or an occupant, and an audio-video-navigation (AVN) device equipped in a vehicle, via a wired/wireless communication technology 70. For example, a communication unit 56 in the in-vehicle user interface control apparatus 50 may be coupled with the audio-video-navigation (AVN) device 72 through a Controller Area Network (CAN), while the mobile device 74 may be coupled with the communication unit 56 via a short-range wireless communication method.

An applicable short-range communication method can include at least one of Bluetooth, Bluetooth Low Energy, Zigbee, Ultra Wide Band (UWB), millimeter wave (mm-Wave), and the like.

The vehicle user interface control apparatus 50 may include a control unit 52 configured to provide a transparent touch screen or the like included in the window 4A of the vehicle as an input/output module used for at least one of a computing device, a camera, and a multimedia device, an air pressure sensor 54 configured to monitor whether a change of an air pressure at a neighboring area of the vehicle window is beyond a predetermined threshold range, and a touch input unit 58a configured to receive a signal corresponding to the touch input sensed by the window. The control unit 52 can generate a signal capable of controlling the input/output module, in response to at least one of the change of the air pressure and the touch input. In addition, the predetermined threshold range, which can be sensed by the air pressure sensor 54, can be set within a pressure range of the human being's breath. Further, The vehicle user interface control apparatus 50 may include a screen adjustment unit 58b configured to adjust or set brightness, contrast, resolution or the like of the transparent touch screen or the like included in the window 4A.

The input/output module included in the window 4A of the vehicle may include a touch input device and a display or screen for at least one of a computing device, a camera, and a multimedia device. The control unit 52 can activate the touch input device and the display or the screen included in the vehicle window 4A, in response to the change of the air pressure delivered from the air pressure sensor 54. Further, the controller 52 may deactivate the touch input device, the display, or the screen if there is no touch input from the user, the driver, or the passenger for a predetermined time after the touch input device, the display, or the screen are activated. In addition, the control unit 52 in the vehicle user interface control apparatus 50 may generate a signal for resetting the touch input device, the display, and/or the screen in response to the change in the air pressure.

The vehicle user interface control apparatus 50 is configured to recognize which device the transparent touch screen included in the vehicle window 4A is engaged with. For this purpose, the controller 52 activates the transparent touch screen in the vehicle window 4A in response to the change of air pressure delivered from the air pressure sensor 54, and then receives from the user, the driver or the passenger which device the transparent touch screen in the vehicle window 4A is interlocked with. For example, the control unit 52 may provide a first touch input button for selecting at least one of a computing device, a camera, and a multimedia device into a user, a driver or a passenger, via a transparent touch screen in the vehicle window 4A. In addition, the control unit 52 may provide a second touch input button for operating or controlling at least one selected among the computing device, the camera, and the multimedia device in response to user's input through the first touch input button into the user, the driver or passenger, through the transparent touch screen in the window 4A.

For example, when the camera 68 is selected through the first touch input button, the provided second touch input button includes a frame determining a photography area of scenery or an object through the vehicle window, a shutter button taking a photograph or a video through the frame, and the like. In addition, the second touch input button may further include an editing button editing the photograph or the video.

Meanwhile, the computing device or the portable terminal 74 engaged with the vehicle user interface control apparatus 50 can provide an application for creating, writing and editing pictures, texts, memos and etc., and store information that is displayed or recorded via the transparent touch screen serving as an input/output module in a memory.

The vehicle user interface control device 50 can include a processing system that comprises at least one data processor and at least one computer-readable memory storing a computer program. According to an embodiment, the vehicle user interface control device 50 may be implemented in a single circuitry chip or board.

In addition, the in-vehicle user interface control apparatus 50 may be configured to engage at least one of the computing device, the camera, and the multimedia device with an audio-video-navigation device mounted in the vehicle. Or, the in-vehicle user interface control apparatus 50 may include a communication unit 56 configured to engage at least one of the computing device, the camera, and the multimedia device with a mobile device 74 coupled with a wireless communication terminal equipped in the vehicle.

The vehicle user interface control apparatus 50 can be interlocked with the vehicle sensor unit 60. For example, the vehicle sensor unit 60 may include a wheel speed sensor 62 configured to sense the movement of the vehicle. When the wheel speed sensor 62 senses the movement of the vehicle, the control unit 52 may deactivate the window near driver's seat to secure driving safety.

The air pressure sensor 54 included in the in-vehicle user interface control apparatus 50 can be engaged with the vehicle sensor unit 60. The vehicle sensor unit 60 may include a door sensor 64 configured to detect whether the door mounted on the vehicle is opened and the window sensor 66 configured to detect whether the window is opened. Based on the information transmitted from the door sensor 64 and the window sensor 66, the controller 82 may activate the air pressure sensor 54 only when the door sensor 64 informs that the door is closed and the window sensor 66 informs that the window 4A is closed. This is because a malfunction of the air pressure sensor 54 might be prevented and power consumption could be reduced. When the window 4A is open, the air pressure sensor 54 adjacent to opened window 4A can be deactivated.

In a vehicle storing an electric energy, a battery management unit (not shown) can be engaged with the vehicle user interface control apparatus 50 through the control unit 52. Further, according to an embodiment, the vehicle user interface control apparatus 50 may further include a battery management unit configured to monitor a state of charge (SOC) of the battery mounted inside the vehicle. The control unit 52 can receive the state of charge (SOC) of the battery from the battery management unit and limit or restrict activation of the window 4A when the state of charge (SOC) of the battery is lower than a predetermined range or level.

As above described, disclosed embodiments can provide a control method or a control apparatus that allows a vehicle window to be used as a user interface of a computing device while the driver, user or occupant using the vehicle is staying in the vehicle, even if the driver, user or occupant using the vehicle does not have a separate computing device or an associated user interface.

In addition, embodiments can improve the intuitiveness of a user interface, which is available in a vehicle, by interlocking operations of a computing device with a behavior of a driver, a user, or a passenger using the vehicle such as his/her hands (finger) or breaths.

Further, since embodiments do not require a separate device for performing a task required by a driver, a user, or a passenger who is not directly related to vehicle, it is possible to enhance driving safety of the vehicle. Further, user's convenience can be increased.

The aforementioned embodiments are achieved by disclosure in a predetermined manner. Each of the structural combination of structural elements and features of the elements or features can be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the present disclosure without departing from the spirit or scope of the disclosures. Thus, it is intended that the disclosure covers the modifications and variations of this disclosure provided they come within the scope of the appended claims and their equivalents.

What is claimed is:

1. A method for controlling an in-vehicle user interface, the method comprising:
    monitoring, by an air pressure sensor, whether a change of an air pressure at a neighboring area of a vehicle window is beyond a predetermined threshold range, the vehicle window serving as an input/output module engaged with a controller;
    activating a touch input device and a window display of the vehicle window in response to a first change of the air pressure;
    sensing a touch input, by the input/output module, via the vehicle window; and
    saving, by the controller, an image corresponding to the sensed touch input in response to a second change of the air pressure.

2. The method according to claim 1, wherein the input/output module includes a transparent touch screen.

3. The method according to claim 2, further comprising:
    displaying the image on the transparent touch screen in response to the sensed touch input.

4. The method according to claim 2, wherein the step of activating includes providing a screen with condensational effect on the transparent touch screen.

5. The method according to claim 2, further comprising:
    displaying a new window for receiving a touch input in response to the image on the transparent touch screen in response to the second change of the air pressure.

6. The method according to claim 2, wherein the transparent touch screen is in an inactive state until the first change of the air pressure is detected by the air pressure sensor.

7. The method according to claim 2, further comprising:
    displaying at least one touch button on the transparent touch screen in response to the first change of the air pressure.

8. The method according to claim 7, further comprising:
    displaying a frame indicating a photography area of a camera engaged with the controller in response to an input through a touch button among the at least one touch button.

9. The method according to claim 8, further comprising:
    adjusting at least a position or a size of the frame in response to at least a zoom function, an angle change or a direction change of the camera.

10. The method according to claim 8, wherein the frame is displayed on a fixed position according to a position and a view direction of the camera.

11. An apparatus for controlling a vehicle window mounted on a vehicle comprising a controller that comprises at least one data processor and at least one computer-readable memory storing a computer program, wherein the controller is configured to cause the apparatus to:
    monitor whether a change of an air pressure at a neighboring area of the vehicle window is beyond a predetermined threshold range, the vehicle window serving as an input/output module engaged with the controller;
    activate a touch input device and a window display of the vehicle window in response to a first change of the air pressure;
    sense a touch input, by the input/output module, via the vehicle window; and
    save an image corresponding to the sensed touch input in response to a second change of the air pressure.

12. The apparatus according to claim 11, wherein the input/output module includes a transparent touch screen.

13. The apparatus according to claim 12, wherein the controller is further configured to display the image on the transparent touch screen in response to the sensed touch input.

14. The apparatus according to claim 12, wherein the controller is further configured to provide a screen with condensational effect on the transparent touch screen in response to the first change of the air pressure.

15. The apparatus according to claim 12, wherein the controller is further configured to display a new window for receiving a touch input in response to the image on the transparent touch screen in response to the second change of the air pressure.

16. The apparatus according to claim 12, wherein the transparent touch screen is in an inactive state until the first change of the air pressure is detected by the air pressure sensor.

17. The apparatus according to claim 12, wherein the controller is further configured to display at least one touch button on the transparent touch screen in response to the first change of the air pressure.

18. The apparatus according to claim 17, wherein the controller is further configured to display a frame indicating a photography area of a camera engaged with the controller in response to an input through a touch button among the at least one touch button.

19. The apparatus according to claim 18, wherein the controller is further configured to adjust at least a position or a size of the frame in response to at least a zoom function, an angle change or a direction change of the camera.

20. The apparatus according to claim 18, wherein the frame is displayed on a fixed position according to a position and a view direction of the camera.

* * * * *